(12) United States Patent
Lee et al.

(10) Patent No.: US 8,565,422 B2
(45) Date of Patent: Oct. 22, 2013

(54) METHOD AND SYSTEM FOR ENRYPTION KEY VERSIONING AND KEY ROTATION IN A MULTI-TENANT ENVIRONMENT

(75) Inventors: Jong Lee, Pleasanton, CA (US); Charles Mortimore, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 184 days.

(21) Appl. No.: 13/206,194

(22) Filed: Aug. 9, 2011

(65) Prior Publication Data

US 2012/0140923 A1    Jun. 7, 2012

Related U.S. Application Data

(60) Provisional application No. 61/419,778, filed on Dec. 3, 2010.

(51) Int. Cl.
*G06F 21/00* (2013.01)

(52) U.S. Cl.
USPC ...... 380/44; 726/3; 726/9; 713/167; 713/168; 713/189; 380/45; 380/277; 705/57

(58) Field of Classification Search
USPC .................................. 380/44, 277
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,084,968 A * | 7/2000 | Kennedy et al. | 380/259 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,286,098 B1 * | 9/2001 | Wenig et al. | 713/151 |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |

(Continued)

*Primary Examiner* — Morshed Mehedi
(74) *Attorney, Agent, or Firm* — Ingrassia Fisher & Lorenz, P.C.

(57) ABSTRACT

Various techniques and procedures related to encryption key versioning and rotation in a multi-tenant environment are presented here. One approach employs a computer-implemented method of managing encrypted data and their associated encryption keys. In accordance with this approach, a key splitting process securely stores a master key used to encrypt tenant-level encryption keys, a key versioning process is used to securely track updated encryption keys, and a key rotation process is used to rotate encrypted data to an updated version of a tenant-level encryption key.

20 Claims, 6 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,889,210 B1 * | 5/2005 | Vainstein ........................ 705/57 |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0152392 A1 * | 10/2002 | Hardy et al. .................. 713/189 |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0110382 A1 * | 6/2003 | Leporini et al. ............... 713/172 |
| 2003/0120675 A1 | 6/2003 | Stauber et al. |
| 2003/0147535 A1 * | 8/2003 | Nadooshan et al. .......... 380/277 |
| 2003/0147536 A1 * | 8/2003 | Andivahis et al. ............ 380/277 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0030918 A1 * | 2/2004 | Karamchedu et al. ........ 713/200 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0088741 A1 * | 4/2007 | Brooks et al. ............. 707/103 R |
| 2007/0143339 A1 * | 6/2007 | Springett ................. 707/103 R |
| 2007/0180259 A1 * | 8/2007 | Bulot et al. ..................... 713/183 |
| 2007/0258594 A1 * | 11/2007 | Sandhu et al. ................. 380/277 |
| 2008/0172730 A1 * | 7/2008 | Sandhu et al. ..................... 726/9 |
| 2009/0177894 A1 * | 7/2009 | Orsini et al. .................... 713/193 |
| 2010/0199088 A1 * | 8/2010 | Nath et al. ...................... 713/167 |

\* cited by examiner

METHOD AND SYSTEM FOR ENRYPTION KEY VERSIONING AND KEY ROTATION IN A MULTI-TENANT ENVIRONMENT

CROSS-REFERENCE TO RELATED APPLICATION

This application claims the benefit of U.S. provisional patent application Ser. No. 61/419,778, filed Dec. 3, 2010.

TECHNICAL FIELD

Embodiments of the subject matter described herein relate generally to data processing systems and techniques, such as systems and processes that use a common network-based platform to support applications executing on behalf of multiple tenants. More particularly, embodiments of the subject matter relate to techniques, protocols, and methodologies for encryption key versioning and rotation.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware.

The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. First, the multi-tenant platform operator can often make improvements to the platform based upon collective information from the entire tenant community.

Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In a multi-tenant environment, each tenant may define custom fields on standard or custom objects. It is often appropriate to encrypt the data and, hence, the encryption key for these custom fields should be protected and securely stored. In addition, depending on the data type, the custom fields may be subject to additional security policies such as The Payment Card Industry Data Security Standard (PCI-DSS). Moreover, some security policies require periodic rotation and re-encryption with an updated key.

Managing the creation, storage, and retrieval of encrypted data and their associated encryption and decryption keys, particularly in the context of key splitting and key rotation schemes, presents unique and complex challenges in a multi-tenant environment.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented here relate to various techniques, protocols, procedures, and technology for encryption key versioning and rotation. The described subject matter can be implemented in the context of any computer-implemented system, such as a software-based system, a database system, a multi-tenant environment, or the like. Moreover, the described subject matter could be implemented in connection with two or more separate and distinct computer-implemented systems that cooperate and communicate with one another.

In a multi-tenant environment it is important to maintain the security of sensitive data, both within an organization and from tenant to tenant. Well known encryption standards and schemes, such as DES or AES, are robust, stable, and demonstrably secure. However, managing encrypted data and associated encryption keys in a multi-tenant environment presents complex security challenges, particularly when key rotation is employed in the context of multiple key versions.

In accordance with exemplary embodiments described below, encrypted data and their associated encryption and decryption keys are created and maintained in accordance with three inter-related schemes: i) a master key scheme involving key splitting; ii) a key versioning scheme for tracking sequential key versions; and iii) a key rotation scheme used to re-encrypt previously encrypted data with a new, updated key version. These three inter-related schemes are described in greater detail below in the context of a multi-tenant environment.

Figure 1:
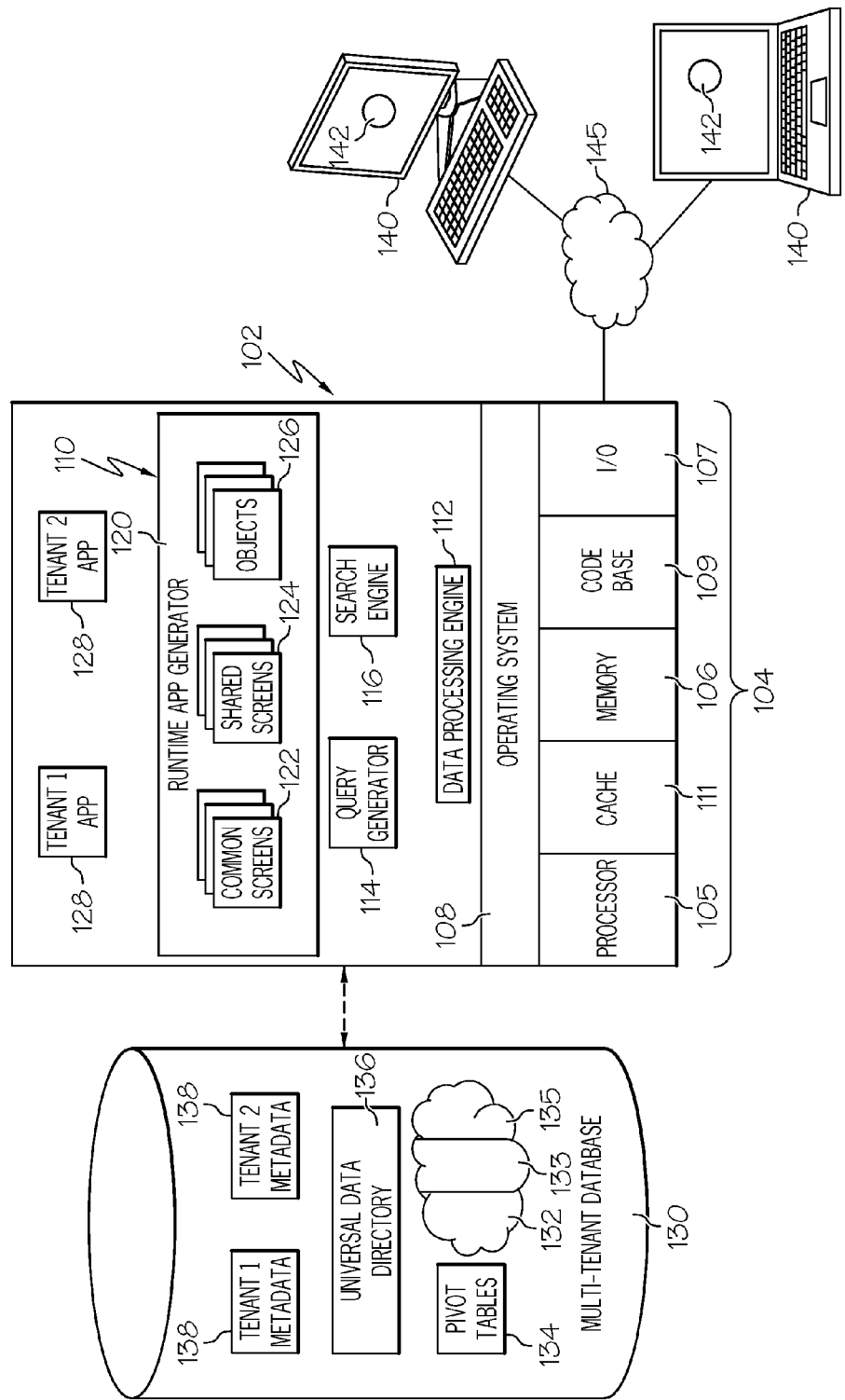
FIG. 1 is a block diagram of an exemplary multi-tenant data processing system.

Turning now to FIG. 1, an exemplary multi-tenant application system 100 suitably includes a server 102 that dynamically creates virtual applications 128 based upon data 132 from a common database 130 that is shared between multiple tenants. Data and services generated by the virtual applications 128 are provided via a network 145 to any number of user devices 140, as desired.

Each virtual application 128 is suitably generated at runtime using a common application platform 110 that securely provides access to the data 132 in the database 130 for each of the various tenants subscribing to the system 100. In accordance with one non-limiting example, the system 100 may be implemented in the form of a multi-tenant customer relationship management system that can support any number of authenticated users of multiple tenants.

A "tenant" or an "organization" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

For example, the data 132 may include custom encrypted fields 133 uniquely associated with a specific tenant. In an exemplary embodiment, encrypted data 133 may be prefixed with a key version number N identifying the particular organization level key that was used to encrypt the custom data field. The data 132 may also include OrgKey data 135 which comprises the encrypted versions of the various OrgKeys previously used to encrypt data 133.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired.

Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like.

In an exemplary embodiment, memory 106 may include: i) code base memory 109 for storing application source code; and ii) cache memory 111. As discussed in greater detail below in connection with FIGS. 3-6, each organization in the multi-tenant environment may have multiple organization-level encryption keys (OrgKeys). At any given point in time, there is only one active OrgKey, where it is created upon first use. The active encryption key, called AOrgKeyN (where N is the OrgKey version number), is kept in the server runtime cache 111, while its encrypted value is stored in the database, for example in data sector 135 (described above).

This caching mechanism facilitates efficient runtime performance inasmuch as it is not necessary to fetch the encrypted version of the OrgKey from the database, and decrypt it with the Master Key (MK) before using it to encrypt (or decrypt) the actual data upon every request. When the encrypted OrgKey is persisted to the database, its key version number N is also associated with it. In an embodiment, the key version numbers N start at integer "1" and increment by one positive integer each time a new OrgKey is created.

With continued reference to FIG. 1, server 102 typically includes or cooperates with some type of computer readable media, where a tangible computer-readable medium has computer-executable instructions stored thereon such as, for example, the source code stored in memory 109. The computer-executable instructions, when read and executed by the server 102, cause the server 102 to perform certain tasks, operations, functions, and processes described in more detail herein.

In this regard, the memory 106 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108.

As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the user devices 140. The virtual applications 128 are typically generated at run-time in response to queries received from the user devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its user device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage the key splitting, key versioning, and key rotation schemes and other techniques, processes, and methods described in more detail below with reference to FIGS. 2-6.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128.

The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, tablet or other network-enabled user device 140 on the network 145. Typically, the user operates a conventional browser or other client program 142 to contact the server 102 via the network 145 using, for example, the hypertext transport protocol (HTTP) or the like.

The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate.

The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the user device 140; other embodiments may simply provide dynamic web or other content that can be presented and viewed by the user, as desired.

As discussed above, in a multi-tenant environment, each organization may be viewed as a separate tenant within the multi-tenant architecture. When an organization defines custom encrypted fields on standard or custom objects, the encryption key used to encrypt data in these custom fields is referred to as an organization-level key, or "OrgKey".

An OrgKey may be used by any number of users and by any number of applications within an organization. When it is desired to view, edit, re-encrypt, or otherwise access encrypted data, the same OrgKey that was used to encrypt the data is again used to decrypt the data. Hence, the OrgKey should be protected and securely stored to prevent access to the OrgKey by anyone outside the organization, and to limit access to the OrgKey to only those within the organization with sufficient privileges.

The following nomenclature is used herein to facilitate the ensuing description of the creation, use, encryption, storage, retrieval, decryption, exportation, archiving, and deletion of OrgKeys:

i. MK: A unique Master Key shared among Pods and used to encrypt and decrypt organization level keys;
 ii. P1MK: The first half of the Master Key, stored on the production server and available only to the server operator (not accessible by the application programmer);
 iii. P2MK: The second half of the Master Key, stored in source code and available only to the application programmer (not accessible by the server operator);
 iv. OrgKey: One of a plurality of organization level keys created and maintained by the tenant, and used to encrypt and decrypt custom fields by the tenant organization;
 v. N: The OrgKey version number (also called the "key version") used to track sequential, updated OrgKeys, where typically N=0, 1, 2, 3 . . . ;
 vi. AOrgKeyN: The currently active OrgKey, version number N;
 vii. EOrgKeyN: The encrypted value of OrgKey version number N; and
 viii. DOrgKeyN: The decrypted value of OrgKey version number N.

The foregoing nomenclature will now be used to describe in detail the following five (5) inter-related processes, in seriatum: 1) key splitting; 2) key versioning; 3) data encryption; 4) data editing; and 5) key rotation.

Key Splitting

Figure 2:
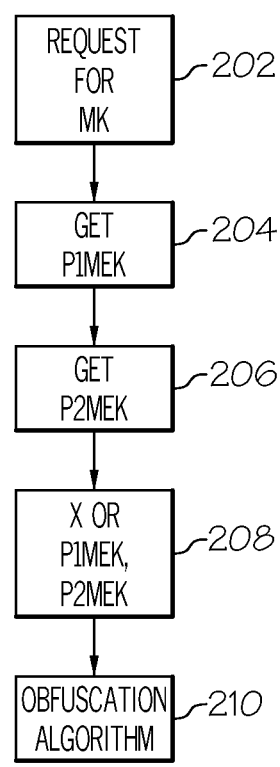
FIG. 2 is a flow chart that illustrates an exemplary embodiment of a master key splitting process.

FIG. 2 is a diagram that illustrates an exemplary protocol flow 200 for storing and retrieving the Master Key (MK) used by an organization. In this regard, whereas each tenant (organization) may have several organization level keys (OrgKeys), each server 102 has only one active Master Key at any given time, which may be utilized by multiple organizations in the multi-tenant environment. This Master Key is used to encrypt and decrypt each organization's OrgKeys. Only a single Master Key is active at a time; however, the Master Key may be rotated for security purposes, for example in conjunction with a major system level update or version release. In the illustrated embodiments the Master Key is not used to encrypt or decrypt the actual data, although it may be so used if desired.

More particularly, in one embodiment a unique Master Key is maintained for all Pods in the multi-tenant environment, whereby half of the key is stored in a file on the production server file system, and another half of the key is stored in source code. During runtime, the two halves are combined to produce a master encryption key (the Master Key). An organization-level encryption key, referred to herein as an OrgKey, is encrypted with the Master Key, and the encrypted format (EOrgKey) is persisted to the database.

The above scheme provides additional encryption key protection using multi-layer processing architecture, where no single layer can retrieve the decrypted version of the key used to encrypt the custom data. Users within the organization responsible for the release and deployment of tenant applications have access to only one half of the Master Key (P1MK) from the file system of the production server, but do not typically have source code access. The developer, on the other hand, can retrieve the other half of the Master Key (P2MK) from source code but cannot typically access the production machine's file system. The database administrator only has the encrypted version of the key (EOrgKeyN), and can't obtain the original key (DOrgKeyN) without the Master Key.

With continued reference to FIG. 2, in an exemplary key splitting scheme 200, a Master Key request is received by the server 102 (task 202). In response, server 102 retrieves the two component halves of the Master Key, namely P1MEK and P2MEK. In the illustrated embodiment, server 102 retrieves the first half of the Master Key (P1MEK) from the production server, i.e., from multi-tenant database 130 (task 204). Server 102 also retrieves the second half of the Master Key (P2MEK) from source code, for example from code base 109 (task 206).

Having assembled the two Master Key halves at runtime, process 200 combines the two halves to create the Master Key (task 208). In one embodiment, this combination may be performed using an "exclusive OR" function, also known as an "XOR" or "X-OR" combination technique. An obfuscation algorithm is then executed (task 210) to obfuscate the Master Key in memory so it cannot be observed during operation.

In an embodiment, the Master Key is obtained using Advance Encryption Standard (AES) 128 bit protocols (tasks 208, 210, and 212). However, any suitable cryptographic techniques may be employed such as, for example, the Data Encryption Standard (DES), triple DES, the well known Whirlpool hash function, Multiscale Electrophysiology Format (MEF), or any other block cipher and/or substitution permutation network methodologies.

Key Versioning

Figure 3:
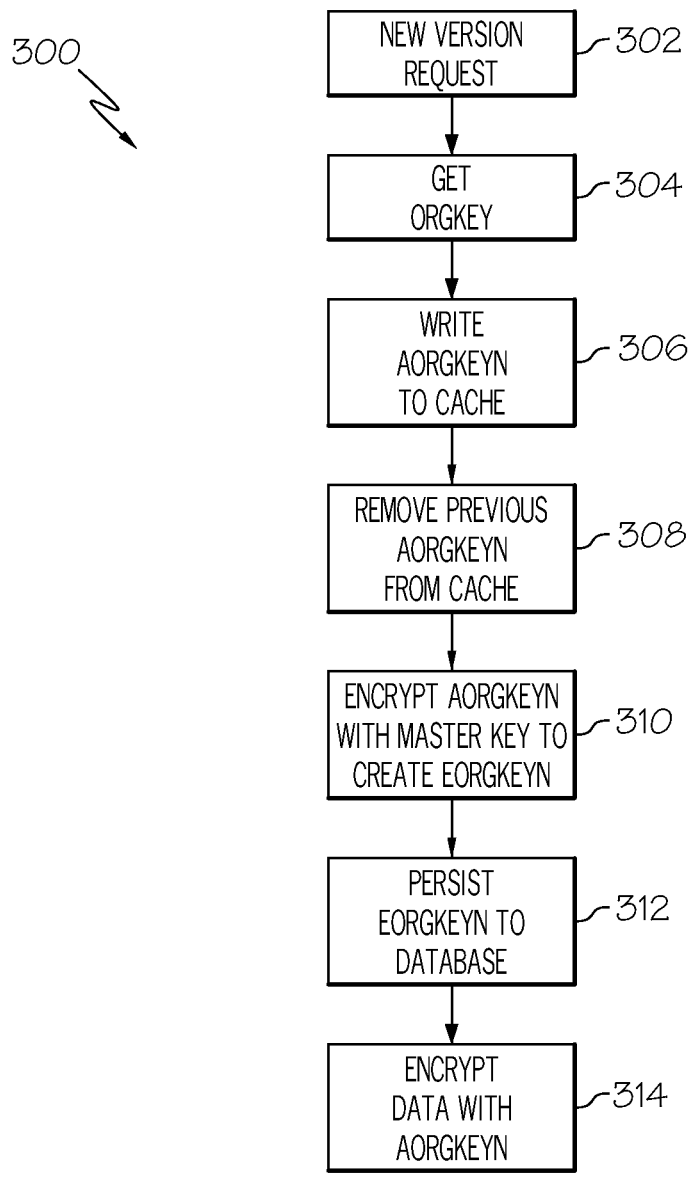
FIG. 3 is a flow chart that illustrates an exemplary embodiment of a key versioning process.

FIG. 3 is a flow chart that illustrates an exemplary embodiment of a key versioning process 300. The key versioning process 300 may begin with a request for a new version of an OrgKey (task 302). In an embodiment, this request comes from a tenant user with sufficient administrative privileges to create a new key version. Alternatively, the request (task 302) may come from a tenant application 128, or the request may result from a scheduled or triggered event. In response to the request, a new OrgKey is created by process 300 (task 304), or one may be fetched from another process or module (task 304).

In the illustrated embodiment, the Master Key is not used to create the new OrgKey, although it may be so used if desired. Rather, any one or combination of cryptography techniques may be employed to generate an OrgKey such as, for example, those set forth above in connection with the disclosed key splitting cryptographic process.

When a new version of an OrgKey (task 304) is obtained, it becomes the current active encryption key for that client, replacing the immediately prior active encryption key (if any). The new active encryption key is written to and maintained in cache 111 (task 306) until the next new active encryption key is created. It should be noted that the previous active encryption key (the encrypted value of which was previously persisted to the database)should be, but need not be, removed from cache 111 (task 308).

Upon creation of a new active key version, the Master Key is retrieved (see process 200, FIG. 2) and used to create an encrypted version (EOrgKeyN) of the active key (task 310). The encrypted version (EOrgKeyN) is persisted to the database (task 310), for example at data sector 135 of multi-tenant database 130.

The unencrypted value of the current active key (AOrgKeyN) in cache 111 may be used by tenant applications 128 to create custom encrypted fields (task 314) on standard or custom objects during runtime, as described above. That is, the active OrgKey is used by the data processing engine 112 to encrypt the actual data (task 314), as appropriate.

Data Encryption

Figure 4:
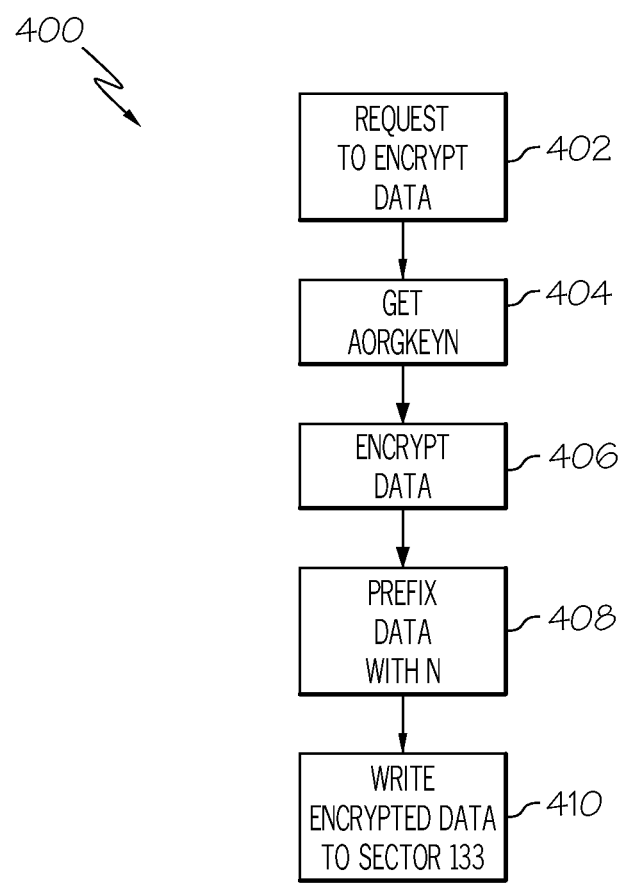
FIG. 4 is a flow chart that illustrates an exemplary embodiment of a data encryption process.

FIG. 4 is a flow chart that illustrates an exemplary embodiment of a data encryption process 400. The data encryption process 400 may begin with a request to define a custom encrypted field on a standard or custom object, that is, a request to encrypt the actual data (task 402). The currently active organization-level encryption key (AOrgKeyN) is retrieved (task 404) and used to encrypt the custom data field (task 406).

The encrypted value of the data is prefixed or otherwise associated with the version number N of the key used to encrypt the data (task 408). In this way, if the encrypted data is later retrieved for decryption, its associated key version will remain associated with the encrypted data to facilitate decryption, if needed. The encrypted data field, prefixed with its associated encryption version number, may then be written to encrypted data sector 133 of database 130 (task 410).

Notably, it is only the version number of the OrgKey, as opposed to the actual OrgKey itself, which is associated with the encrypted data in the illustrated embodiments. As discussed above, the encrypted values of the various OrgKeys used to initially encrypt the data may be maintained in storage, for example in data sector 135 of multi-tenant database 130.

Data Editing

Figure 5:
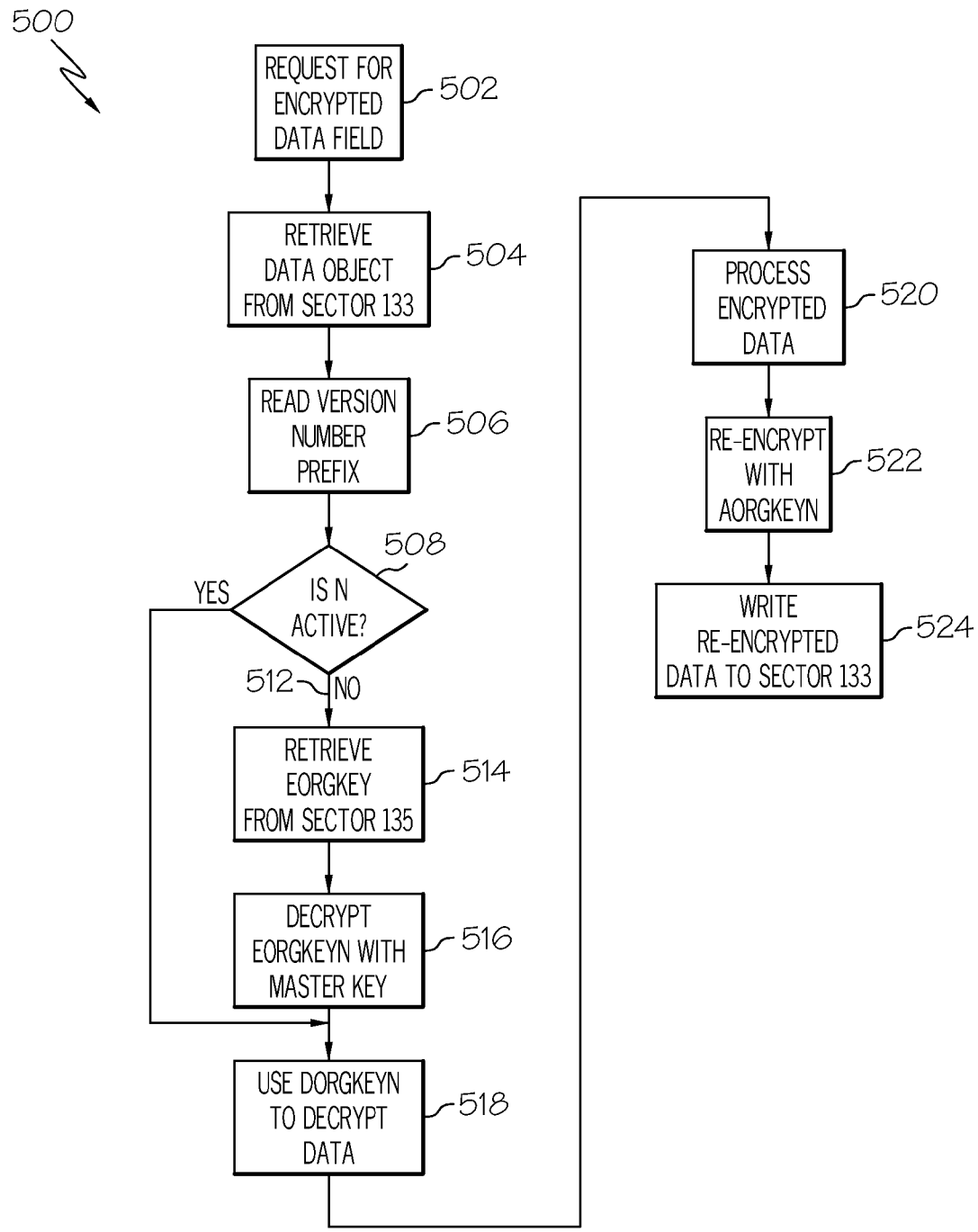
FIG. 5 is a flow chart that illustrates an exemplary embodiment of a data editing process.

FIG. 5 is a flow chart that illustrates an exemplary embodiment of a data editing process 500. The data editing process 500 may begin with a request to edit a custom encrypted field, that is, a request to retrieve from memory a data field that has been previously encrypted (see process 400, FIG. 4) (task 502). This request for encrypted data may come from a user, for example via a tenant application 128. Alternatively, the request (task 502) may emanate from an administrative user, e.g. in connection with the data rotation process 600 described in detail below in conjunction with FIG. 6.

Upon receipt of a request for encrypted data, the encrypted data object is retrieved from data sector 133 (task 504). The version number of the encryption key used to initially encrypt the data object is read (task 506). Process 500 then determines if the version number of the encrypted data object corresponds to the current active key (task 508). If the version number of the retrieved data object matches the version number of the current active key ("YES" branch from task 508), the current active key (AOrgKeyN) is used to decrypt the data (task 518).

If the version number of the encrypted data object does not match the version number of the active key ("NO" branch from task 512), the encrypted value (EOrgKeyN) of the key associated with the encrypted object is retrieved from data sector 135 of database 130 (task 514). The Master Key is retrieved, fetched, or otherwise obtained (see process 200 at FIG. 2) and used to decrypt EOrgKeyN (task 516). The decrypted value (DOrgKeyN) of the key used to initially encrypt the data object may then be used to decrypt the data (task 518).

The unencrypted value of the data object may then be processed (task 520) in accordance with user or administrative input, or in accordance with tenant application 128 (task 520). Upon processing (editing), if the custom field has not been deleted it may be re-encrypted with the active key (AOrgKeyN) (task 522), and returned to data sector 133 (task 524), as described above in connection with process 400 in the context of FIG. 4.

Key Rotation

Figure 6:
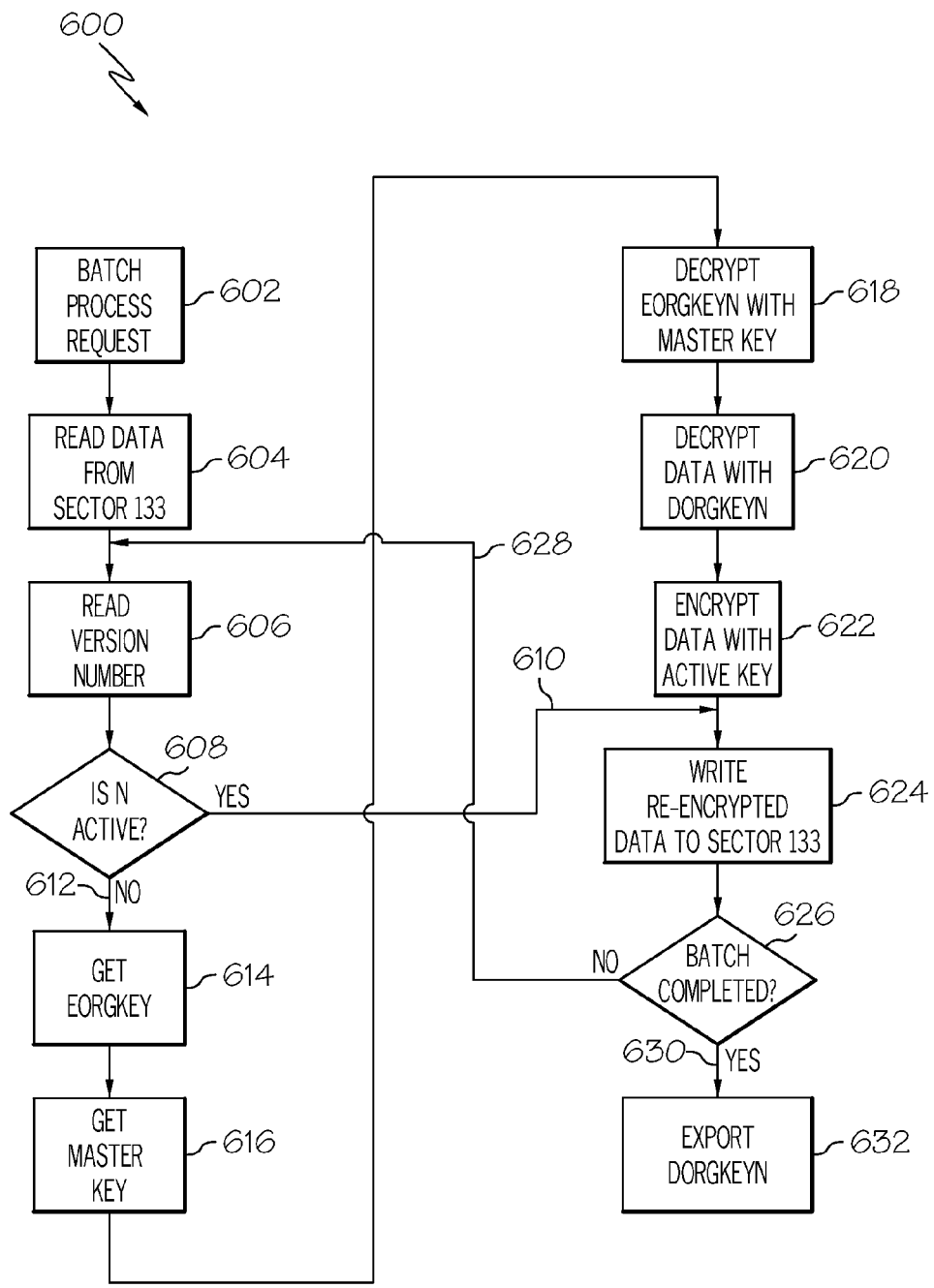
FIG. 6 is a flow chart that illustrates an exemplary embodiment of a key rotation process.

FIG. 6 is a flow chart that illustrates an exemplary embodiment of a key rotation process 600. When it is desired to update all or a significant portion of an organization's data to a new key version, rotation process 600 may be commenced by an administrator, or by a scheduled or triggered event. Because key rotation is typically a batch process, it may be advantageous to rotate the data during off-peak hours, for example late night or early morning.

The key rotation process 600 may begin with a batch process request (task 602), whereupon one or more blocks of previously encrypted data are read from data sector 133 (task 604). The key version number is read from the data fields to be rotated (Task 606). Process 600 then determines if the key version matches the key version for the currently active key (task 608). If so ("YES" branch from task 608), the data is deemed current (task 624). If the key version number associated with the data to be rotated does not match the current active key ("NO" branch from task 608), which is the typical case during a key rotation process, the encrypted value EOrgKeyN of the key associated with the data is retrieved from data sector 135 (task 614).

Key rotation process 600 then retrieves the Master Key (task 616), and uses the Master Key to decrypt EOrgKeyN (task 618). Having obtained the decrypted value DOrgKeyN of the key associated with the data being rotated, the underlying data itself may now be decrypted using DOrgKeyN as the data decryption key (task 620). The "raw" data is then re-encrypted with the current active key AOrgKeyN (task 622), and returned to data sector 133 of multi-tenant database 130 (task 624).

Process 600 then determines if the batch is complete (task 626), i.e., whether all the data fields in the batch have been rotated (task 626). If so ("YES" branch of task 626), the now obsolete OrgKeyN is exported from the server (task 632). If additional data fields remain to be rotated ("NO" branch from task 626), process 600 returns to task 606 and sequentially re-encrypts data until all fields in the batch have been updated to the active key.

The techniques and methodologies described above enable an administrator to initiate a key rotation update process at scheduled times, as a function of data volume or the number of existing key versions, or in accordance with any desired function or triggering event, as appropriate. For example, if it is known or suspected that data or an OrgKey has been corrupted or compromised, the data in question may be summarily updated to a new key version upon administrator prompt.

The various tasks performed in conjunction with the processes described in FIGS. 2-6 may be performed by software, hardware, firmware, or any combination thereof. For illustrative purposes, these descriptions of illustrated processes may refer to elements mentioned in connection with the other drawing figures. In practice, portions of a described process may be performed by different elements of a system, e.g., a processor, a data processing engine, or any functional or operating module thereof.

It should be appreciated that a described process may include any number of additional or alternative tasks. Moreover, the tasks need not necessarily be performed in the illustrated order, and a described process may be incorporated into a more comprehensive procedure or process having alternative or additional functionality which is not described in detail herein. Additionally, one or more of the tasks shown in a drawing figure could be omitted from an embodiment of the respective process as long as the intended overall functionality remains intact.

It will be appreciated that deleting a key associated with encrypted data may prevent decryption of the encrypted data. In order to recover this data, an administrative user or user with sufficient privileges may re-import a deleted key, provided the deleted key was properly exported prior to deletion. In an embodiment, an exemplary format for an exported key may be written as:

Base64(key_id+key_version+
encrypted_key_bytes_in_base64format)

The foregoing approach constitutes a fallback mechanism for data recovery in the event a key rotation process fails.

Generally speaking, the various functions and features of the methods described in FIGS. 2-6 may be carried out with any sort of hardware, software, and/or firmware logic that is stored or executed on any type of platform. Some or all of these methods may be carried out, for example, by logic executing within system 100 in FIG. 1. For example, various functions shown in FIG. 2-6 may be implemented using software or firmware logic that is stored in memory 106 and/or memory 109 and executed by processor 105 as part of application platform 110.

The particular hardware, software, and/or firmware logic that implements any of the functions described in FIGS. 2-6 may nevertheless vary from context to context, implementation to implementation, and embodiment to embodiment in accordance with the various features, structures, and environments set forth herein. The particular means used to implement each of the various functions shown in FIGS. 2-6, then, could be any sort of processing structures that are capable of execution software and/or firmware logic in any format, and/ or any sort of application-specific or general purpose hardware, including any sort of discrete and/or integrated circuitry.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented.

In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method for managing encryption keys in a multi-tenant environment, comprising:
    maintaining by a multi-tenant platform operator, a server platform that interfaces with a multi-tenant database and dynamically executes virtual applications for a plurality of tenants each having a unique organization level encryption key, the server platform including a source code memory sector not located at said multi-tenant database and accessible by said tenants;
    storing a first portion of a master key in a first sector of a file system associated with said multi-tenant database such that said first portion of said master key is not accessible by said tenants and is accessible by said platform operator; and
    storing a second portion of said master key in said source code memory sector accessible by only a first one of said tenants.

2. The method of claim 1, further comprising:
    retrieving, during runtime execution of a first one of said virtual applications, said first and second portions of said master key;
    combining said first and second portions to produce a master key associated with said server platform; and
    executing an obfuscation algorithm on said master key.

3. The method of claim 2, further comprising:
    generating a first organization-level encryption key and encrypting said first organization-level encryption key with said master key to produce and encrypted value of said first organization-level encryption key.

4. A computer-implemented method for managing encryption keys in a multi-tenant environment wherein a multi-tenant platform operator maintains a server platform that interfaces with a multi-tenant database and dynamically executes virtual applications for a plurality of tenants each having a unique organization level encryption key, the server platform including a source code memory sector not located at said multi-tenant database and not accessible by said tenants, the method comprising:
    storing a first portion of a master key in a first sector of a file system associated with said multi-tenant database such that said first portion of said master key is not accessible by said tenants and is accessible by said platform operator;
    storing a second portion of said master key in said source code memory sector accessible by only a first one of said tenants;
    retrieving, during runtime execution of a first one of said virtual applications, said first and second portions of said master key;
    combining said first and second portions to produce a master key associated with said server platform;
    executing an obfuscation algorithm on said master key;
    generating a first organization-level encryption key and encrypting said first organization-level encryption key with said master key to produce and encrypted value of said first organization-level encryption key;
    persisting said encrypted value of said first organization-level encryption key to said first sector of said file system;
    storing said first organization-level encryption key in a runtime cache associated with said server platform; and
    using said first organization-level encryption key to encrypt first data associated with said first tenant during runtime execution of said first virtual application.

5. The method of claim 4, further comprising:
    assigning a first version number to said first organization-level encryption key; and
    appending said first version number to said encrypted value of said first organization-level encryption key.

6. The method of claim 5, wherein said persisting step comprises writing said encrypted value of said first organization-level encryption key, along with a prefix corresponding to said first version number, to said first sector of said file system which is accessible to said first tenant but not accessible to other tenants.

7. The method of claim 6, further comprising:
    appending said first version number to the encrypted value of said first data; and
    storing said first version number and said encrypted value of said first data in said first sector of said file system.

8. The method of claim 7, further comprising:
    retrieving said encrypted value of said first data from said first sector of said file system;
    retrieving said encrypted value of said first organization-level encryption key from said first sector of said file system;
    retrieving said unique master key associated with said server platform;

using said unique master key to decrypt said encrypted first organization-level encryption key; and
using the decrypted value of said first organization-level encryption key to decrypt the encrypted value of said first data.

9. The method of claim 8, further comprising:
generating a second organization-level encryption key;
assigning a second version number to said second organization-level encryption key;
appending said second version number to said second organization-level encryption key;
encrypting said second organization-level encryption key with said master key to produce an encrypted value of said second organization-level encryption key; and
persisting said second version number and said encrypted value of said second organization-level encryption key to said first sector of said file system.

10. The method of claim 9, further comprising:
storing said second organization-level encryption key in said runtime cache;
removing said first organization-level encryption key from said runtime cache; and
using said second organization-level encryption key to encrypt data during runtime execution of said first virtual application.

11. The method of claim 10, further comprising:
retrieving the decrypted value of said first data; and
using said second organization-level encryption key in said runtime cache to re-encrypt said first data.

12. The method of claim 11, further comprising:
appending said second version number to the re-encrypted value of said first data; and
storing the re-encrypted value of said first data, along with said second version number, in said first sector of said file system.

13. The method of claim 4, wherein said first and second portions of said master key are combined using an exclusive OR combination technique.

14. A method for managing encryption keys for a server platform, comprising:
providing a multi-tenant database that interfaces with the server platform;
dynamically executing a virtual application for a tenant having a tenant encryption key, the server platform including local source code memory;
retrieving a first portion of a master key from a first sector of a file system associated with said database; and
retrieving a second portion of said master key from said source code memory;
combining said first and second portions to create a unique master key associated with said server platform; and
assigning a version key number to said tenant encryption key; and encrypting said tenant encryption key with said master key to produce an encrypted value of said tenant encryption key.

15. A method for managing encryption keys for a server platform that interfaces with a multi-tenant database and dynamically executes a virtual application for a tenant having a tenant encryption key, the server platform including local source code memory, the method comprising:
retrieving a first portion of a master key from a file system associated with said database; and
retrieving a second portion of said master key from said source code memory;
combining said first and second portions to create a unique master key associated with said server platform and assigning a version key number to said tenant encryption key;
encrypting said tenant encryption key with said master key to produce an encrypted value of said tenant encryption key;
storing said tenant encryption key in an unencrypted format in a runtime cache of said server platform;
using said tenant encryption key to encrypt data associated with said tenant during runtime execution of said virtual application; and
storing said encrypted data and a version key number associated with said encrypted data in said multi-tenant database.

16. The method of claim 15, further comprising persisting said encrypted value of said tenant encryption key along with said version number to said database.

17. The method of claim 16, further comprising:
retrieving, from said database, said encrypted data and its associated encryption key version number;
retrieving, from said database, the encrypted value of the tenant encryption key corresponding to the version key number associated with said encrypted data;
retrieving said master key;
decrypting said tenant encryption key with said master key to reveal the decrypted value of said tenant encryption key;
decrypting said encrypted data with said decrypted tenant encryption key; and
re-encrypting said data using the tenant encryption key currently residing in said runtime cache.

18. The method of claim 15, further comprising executing an obfuscation algorithm on said master key, wherein said first and second portions are combined to create a unique master key using an exclusive OR function, and further wherein said master key comprises an AES 128 bit key.

19. A method for managing encryption keys for a server platform that interfaces with a multi-tenant database and dynamically executes a virtual application for a tenant having a tenant encryption key, the server platform including local source code memory, the method comprising:
retrieving a first portion of a master key from a file system associated with said database; and
retrieving a second portion of said master key from said source code memory;
combining said first and second portions to create a unique master key associated with said server platform and assigning a version key number to said tenant encryption key;
encrypting said tenant encryption key with said master key to produce an encrypted value of said tenant encryption key;
periodically providing updated versions of said first and said second portions of said master key;
combining said updated versions of said first and second portions to create an updated master key associated with said server platform; and
re-encrypting said tenant encryption key with said updated master key.

20. A method for updating the encryption key version for encrypted data stored in a multi-tenant database maintained by a server platform which dynamically executes virtual applications for a plurality of tenants, the server platform including source code memory not located at said database, the method comprising:
storing a first portion of a master key in a file system associated with said database;

storing a second portion of said master key in said source code memory;

retrieving, during runtime execution of a first one of said virtual applications, said first and second portions of said master key;

combining said first and second portions to produce a master key associated with said server platform;

generating a first organization-level encryption key for a first one of said tenants;

assigning a first version number to said first organization-level encryption key;

storing said first organization-level encryption key in a runtime cache associated with said server platform;

encrypting said first organization-level encryption key with said master key to produce an encrypted value of said first organization-level encryption key;

persisting the encrypted value of said first organization-level encryption key and its associated version number to said database;

using said first organization-level encryption key to encrypt first data associated with said first tenant during runtime execution of said first virtual application;

storing said first version number along with said encrypted value of said first data in said database;

generating a second organization-level encryption key;

assigning a second version number to said second organization-level encryption key;

appending said second version number to said second organization-level encryption key;

encrypting said second organization-level encryption key with said master key to produce an encrypted value of said second organization-level encryption key; and persisting said second version number and said encrypted value of said second organization-level encryption key to said first sector of said file system;

storing said second organization-level encryption key in said runtime cache;

removing said first organization-level encryption key from said runtime cache;

retrieving said encrypted value of said first data from said first sector of said file system;

retrieving said encrypted value of said first organization-level encryption key from said first sector of said file system;

retrieving said master key associated with said server platform;

using said unique master key to decrypt said encrypted first organization-level encryption key;

using the decrypted value of said first organization-level encryption key to decrypt the encrypted value of said first data; and using said second organization-level encryption key in said runtime cache to re-encrypt said first data.

* * * * *